(12) United States Patent
Kang et al.

(10) Patent No.: US 6,782,069 B1
(45) Date of Patent: Aug. 24, 2004

(54) IN-PILE CREEP TEST SYSTEM

(75) Inventors: Young-Hwan Kang, Daejeon (KR);
Bong-Goo Kim, Daejeon (KR);
Wan-Young Maeng, Daejeon (KR);
Yong Choi, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 14 days.

(21) Appl. No.: 10/245,412

(22) Filed: Sep. 18, 2002

(51) Int. Cl.[7] .......................... G21C 23/00; G01M 3/16
(52) U.S. Cl. ...................... 376/258; 376/202; 376/340; 376/341; 376/342; 376/344
(58) Field of Search ............................... 376/258, 202, 376/340–345

(56) References Cited

U.S. PATENT DOCUMENTS

| | | | | |
|---|---|---|---|---|
| 3,392,086 A | * | 7/1968 | Bret et al. | 176/19 |
| 3,521,477 A | * | 7/1970 | Dollet | 73/15.6 |
| 3,803,365 A | * | 4/1974 | Cartier | 176/19 R |

FOREIGN PATENT DOCUMENTS

| | | | |
|---|---|---|---|
| JP | 63-075696 | * | 4/1988 |
| JP | 01-025096 | * | 1/1989 |
| JP | 01-245127 | * | 9/1989 |
| JP | 01-245128 | * | 9/1989 |
| JP | 04-305195 | * | 10/1992 |
| JP | 09-145891 | * | 6/1997 |
| JP | 2003-121589 | * | 4/2003 |
| KR | 2002-074351 | * | 9/2002 |

OTHER PUBLICATIONS

An article entitled "The Influence of Specimen Size on Measurement . . . ", By Garner et al.
An article entitled, "Capsule Design, Fabrication and Irradiation . . . ", By Saito et al., pp. 219–225.

(List continued on next page.)

Primary Examiner—Jack Keith
(74) Attorney, Agent, or Firm—Bachman & LaPointe, P.C.

(57) ABSTRACT

The present invention provides a remote-controlled in-pile creep test system used in in-pile creep tests for measuring and determining mechanical properties of nuclear materials irradiated in research reactors. The in-pile creep test system includes a creep tester vertically installed in a water pool of a nuclear reactor and used in a tensile, compressive or repeated loading or low cyclic fatigue creep test; a detecting unit electrically connected to the creep tester and used for detecting a temperature of the tester and creep strain of a specimen installed in the tester; a gas supply unit connected to the creep tester through gas supply tubes and controllably supplying helium gas from a helium gas reservoir tank to the tester or returning helium gas from the tester to the tank by an operation of an air compressor and a vacuum pump; and a control unit electrically connected to both the detecting unit and gas supply unit so as to control an operation of the creep test system in response to results of a comparison of input data from the detecting unit and the gas supply unit with stored data, whereby the creep tester has simple structure for the convenience of installing the specimen and assembling the capsule parts and also is easily cut and disassembled in a hot cell, and prevents damage or breakage of the specimen during a procedure of removing the specimen from the tester after a creep test, and is used for performing creep tests for specimens having a variety of shapes and sizes.

15 Claims, 7 Drawing Sheets

OTHER PUBLICATIONS

An article entitled "Effects of Neutron Irradiation on Creep . . . ," By Aoto et al., pp. 27–37.

An article entitled "Irradiation Creep Test of Zircaloy–4 Cladding," By Mural et al., pp. 210–219.

An article entitled "Temperature Controlled Material Irradiation . . . ," By Furstenau et al.

Japanese No. 9–145891. This document is in Japanese and there is no English abstract provided.

\* cited by examiner

IN-PILE CREEP TEST SYSTEM

BACKGROUND OF THE INVENTION

1. Field of the Invention

The present invention relates to in-pile creep test systems and, more particularly, to a remote-controlled in-pile creep test system used in in-pile tests for measuring and determining mechanical properties of nuclear materials irradiated in research reactors.

2. Description of the Prior Art

As well known to those skilled in the art, a variety of in-pile creep tests or so-called materials irradiation tests have been performed in research reactors in order to measure or determine the integrity of nuclear materials irradiated in the reactors, in the procedure of developing new nuclear materials.

Particularly, creep tests for structural nuclear materials, such as the materials for clad tubes or pressure vessels, must be performed under irradiation in research reactors.

In-pile creep test systems for performing such creep tests in research reactors are each installed in the reactor core containing distilled water, so the systems must have high structural and operational stability and reliability.

In addition, the in-pile creep test systems must be designed such that they are usable for testing irradiated nuclear materials having various sizes and shapes, such as materials having cylindrical shapes, plate-type shapes or rod-type shapes, and have structures capable of allowing sufficient and constant irradiation to specimens, and are easily manipulated in the reactors.

Furthermore, the in-pile creep test systems must be disassembled by remote-controlled manipulators in hot cells after creep tests, and be reduced the number of their disassembled parts, thus reducing the amount of nuclear wastes.

Capsule-type creep test systems for creep tests in research reactors have been typically classified into several types, that is, non-instrumented capsule-type systems without having any testing instrument in the capsules, instrumented capsule-type systems having various testing instruments in the capsules, and special instrumented capsule-type systems, which are capable of measuring mechanical properties of irradiated materials. In the field of creep tests, such capsule-type test systems are typically referred to simply as "non-instrumented capsules", "instrumented capsules" and "special instrumented capsules", respectively.

In order to perform a materials irradiation test using a creep test system, an operator installs a specimen of a target material in a predetermined unit of the capsule, prior to assembling the units of the test system into a single structure. In such a case, some units are welded in the capsule, thus being fixed to the capsule.

In a materials irradiation test using a special instrumented capsule-type system, creep strain is measured while applying tensile load or compressive load or repeated cyclic loading to an irradiated specimen so as to form creeps on the specimen for accomplishing the object of the test for measuring and determining mechanical properties of the irradiated specimen.

Therefore, several additional instruments, such as measuring instruments, must be installed in the capsule of such a special instrumented capsule-type system, so it is almost impossible to use the capsule of a conventional non-instrumented capsule-type system or of a conventional instrumented capsule-type system as the capsule of a special instrumented capsule-type system.

The instruments, such as measuring instruments, which are installed in the capsule of a special instrumented capsule-type system must be designed and fabricated while considering the following factors: That is, the instruments do not affect the exposure dose of irradiation to a specimen in a capsule, and allow an application of tensile or compressive load or repeated cyclic loading to the specimen, and minimize the amount of nuclear wastes generated by the disassembled parts of the test system after a creep test.

In such a capsule-type creep test system, some units are welded in the capsule, so it is necessary to design the system such that the capsule is easily cut and disassembled in a hot cell after a creep test. In addition, a bellows, an LVDT (linear variable differential transducer) etc. are irradiated during a creep test, so it is almost impossible to reuse them. However, it is desired to carefully disassemble the irradiated units, such as the bellows and LVDT, so as to prevent damage to the units in an effort to avoid breakage of a specimen after a creep test.

The creep test system is also designed and fabricated such that it is possible to avoid any damage or breakage of the specimen during a procedure of disassembling the irradiated specimen from the test system after a creep test.

The special instrumented capsule-type creep test system is installed in a research reactor, so the system must have high structural stability and reliability, and can be compatibly used in measuring and determining mechanical properties of various irradiated materials.

SUMMARY OF THE INVENTION

Accordingly, the present invention has been made keeping in mind the above problems occurring in the prior art, and an object of the present invention is to provide an in-pile creep test system, which is used in an in-pile creep test for measuring mechanical properties of nuclear materials irradiated in a research reactor, and which is designed to be remote-controlled.

In order to accomplish the above objects, the present invention provides an in-pile creep test system, comprising: a creep tester vertically installed in the reactor pool of a nuclear reactor, and used in a tensile or compressive or low cyclic fatigue creep test; a detecting unit electrically connected to the creep tester, and used for detecting a temperature of the tester and creep strain of a specimen installed in the tester; a gas supply unit connected to the creep tester through gas supply tubes, and controllably supplying helium gas from a helium gas reservoir tank to the tester or returning helium gas from the tester to the tank by an operation of an air compressor and a vacuum pump; and a control unit electrically connected to both the detecting unit and gas supply unit so as to control an operation of the creep test system in response to results of a comparison of input data from the detecting unit and the gas supply unit with stored data, whereby the creep tester has simple structure for the convenience of installing speimen and assembling parts and also is easily cut and disassembled in a hot cell, and prevents damage or breakage of the specimen during a procedure of removing the specimen from the tester after a creep test, and is used for performing creep tests for specimens having a variety of shapes and sizes.

The creep tester comprises: a fixing unit fixed to the reactor pool so as to vertically install the creep tester in reactor pool; a pressurizing unit pressurized or depressurized by compressed helium gas fed into a chamber defined in the creep tester at a position adjacent to the fixing unit; a movable unit for applying tensile load, compressive load or repeated load to the specimen in response to an operation of the pressurizing unit; a heating unit assembled with the movable unit and used for heating the specimen; a measuring unit for detecting a movement of the movable unit so as to measure creep strain of the specimen; and a cylindrical capsule consisting of a plurality of capsule parts, with the fixing unit being mounted to an end of the capsule, and the pressurizing unit, movable unit, heating unit and the measuring unit being sequentially housed in the capsule.

The fixing unit comprises: a base plate provided at an end of the capsule; a fixing shaft axially projecting from a center of the base plate; a stop plate movably fitted over the fixing shaft; and an elastic member provided between the base plate and the stop plate so as to bias the stop plate in a predetermined direction.

The pressurizing unit comprises: a first plate fixedly set in the capsule at a position spaced apart from the base plate at a predetermined interval, and defining the chamber; a bellows tube mounted to the first plate at a position inside the chamber; a push plate integrally mounted to an end of the bellows tube so as to selectively push the movable unit.

The first plate has a central opening through which the push rod of the movable unit movably passes.

A push rod slot is formed on the push plate so as to allow a push rod of the movable unit to come into precise contact with the push plate.

The movable unit comprises: a first holder unit set at a position adjacent to a first plate of the pressurizing unit, and divided on the basis of a central axis of the capsule into two parts which are spaced apart from each other by a predetermined gap; and a second holder unit assembled with the first holder unit while being partially overlapped with the first holder unit, the second holder unit being movably assembled with a first guide stopper which is set in the capsule at a position spaced apart from the first plate of the pressurizing unit by a predetermined distance.

The first holder unit comprises: a guide slot formed along the central axis of the capsule; an upper holder plate formed at an upper portion around the guide slot, and having a plurality of upper locking holes; and a lower holder plate formed at a lower portion around the guide slot so as to face the upper holder plate, and having a plurality of lower locking holes.

The second holder unit comprises: a push rod having a predetermined length and movably passing through a central hole of the first plate; a U-shaped specimen holding rod coupled to an end of the push rod so as to hold the specimen; a cylindrical holder pipe connected to an end of the U-shaped specimen holding rod and having a plurality of upper and lower locking holes so as to hold the specimen with the use of locking pins inserted in the upper and lower locking holes; and a slide shaft connected to an end of the cylindrical holder pipe and movably passing through the central opening of the first guide stopper.

The slide shaft has a probe-seating slot at a center of an end surface thereof, such that a probe of a strain-measuring instrument, such as a linear variable differential transducer, is precisely arranged along the central axis of the capsule.

A bearing member is set in the central opening of the first guide stopper so as to movably bear the slide shaft in the first guide stopper while preventing frictional contact between the first guide stopper and the slide shaft.

The heating unit comprises: a cylindrical heater housing, with an axial slit formed at a sidewall of the heater housing so as to allow the heater housing to be fitted over the U-shaped specimen holding rod of the movable unit from a side of the U-shaped specimen holding rod; a plurality of tube-seating grooves axially formed on an external surface of the heater housing so as to allow the gas supply tubes to pass along the external surface of the heater housing; and a heater made of silicon carbide and set in the sidewall of the heater housing, and electrically connected to the detecting unit.

The measuring unit comprises: a strain-measuring instrument, such as a linear variable differential transducer (LVDT), axially passing through the center of a second guide stopper in the capsule such that the strain-measuring instrument is axially aligned with a slide shaft of the movable unit held by a first guide stopper; and a fixing cap assembled with an end of the strain-measuring instrument, and attached to an end surface of a third guide stopper mounted in the capsule.

The capsule is a cylindrical body consisting of: a first capsule part for supporting the fixing unit, and housing the pressurizing unit while defining the chamber, with a first plate being welded to an internal surface of the first capsule part so as to hold the pressurizing unit in the first capsule part; a second capsule part assembled with an end of the first capsule part and housing the movable unit, with a first guide stopper being welded to an inner surface of the second capsule part so as to hold the movable unit in the second capsule part; a third capsule part assembled with an end of the second capsule part and housing the measuring unit, with a second guide stopper being welded to an inner surface of the third capsule part so as to hold the measuring unit in the third capsule part such that the measuring unit is aligned with a central axis of the third capsule part; a fourth capsule part assembled with an end of the third capsule part and housing a fixing cap of a strain-measuring instrument, with a third guide stopper being welded to an inner surface of the fourth capsule part so as to hold the fixing cap in the fourth capsule part; and a sealing capsule part having a plurality of porous sealing plates assembled with an end of the fourth capsule part so as to seal the fourth capsule part through which electric wires for both the heating unit and the measuring unit are led into the capsule and the gas supply tubes are led from the gas supply unit into the capsule, whereby the capsule parts are isolated from each other and independently sealed, so even though there is breakage or damage to a part of the creep tester, the breakage or damage is not propagated to another part, but is limited to the originally broken or damaged part, thus improving structural stability and operational reliability of the creep tester.

In the in-pile creep test system, the detecting unit is electrically connected to the control unit, the heater of the heating unit, the LVDT or the strain-measuring instrument, thus detecting a temperature of the heating unit and creep strain of the specimen.

The gas supply unit is electrically connected to the control unit, and communicates with the air compressor, a vacuum pump, and a helium gas reservoir tank through tubes, and is connected to the chamber of the pressurizing unit through the gas supply tubes.

The in-pile creep test system of the present invention performs a desired creep test for irradiated materials with the use of the special instrumented capsule type creep tester installed in a reactor pool containing distilled water.

That is, in order to perform a tensile creep test, the creep tester is vertically installed on the base in the reactor pool by fixing the fixing unit of the tester to the base. During a tensile creep test, the control unit controls the detecting unit in response to stored data, thus activating the heating unit. At the same time, the control unit controls the gas supply unit to feed compressed helium gas to the chamber of the pressurizing unit, thus allowing the pressurizing unit to advance to move the movable unit and creating tensile strain of the specimen installed in the movable unit.

In such a case, the measuring unit, which is in contact with the movable unit, measures the strain of the specimen, and outputs a signal indicative of the creep strain. The control unit thus compares data signals from both the measuring unit and the detecting unit with stored date, and controls the gas supply unit in response to the signal comparison results so as to controllably supply or return helium gas to or from the chamber.

In order to perform a compression creep test, the bellows tube of the pressurizing unit is compressed to the maximum with the use of the gas supply unit during a procedure of assembling the parts of the creep tester into a single structure. During a compression creep test, the helium gas is returned from the chamber to the helium gas reservoir tank under the control of the control unit, thus depressurizing the chamber and simultaneously the helium gas is supplied to the second capsule part to effectively pull the movable part. The pressurizing unit is thus retracted to create compressive strain of the specimen. In an effort to enhance a depressurizing effect of the chamber as well as allowing an easy retraction of the movable unit during such a compressive creep test, a spring may be installed on the push rod of the movable unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference should now be made to the drawings, in which the same reference numerals are used throughout the different drawings to designate the same or similar components.

Figure 1:
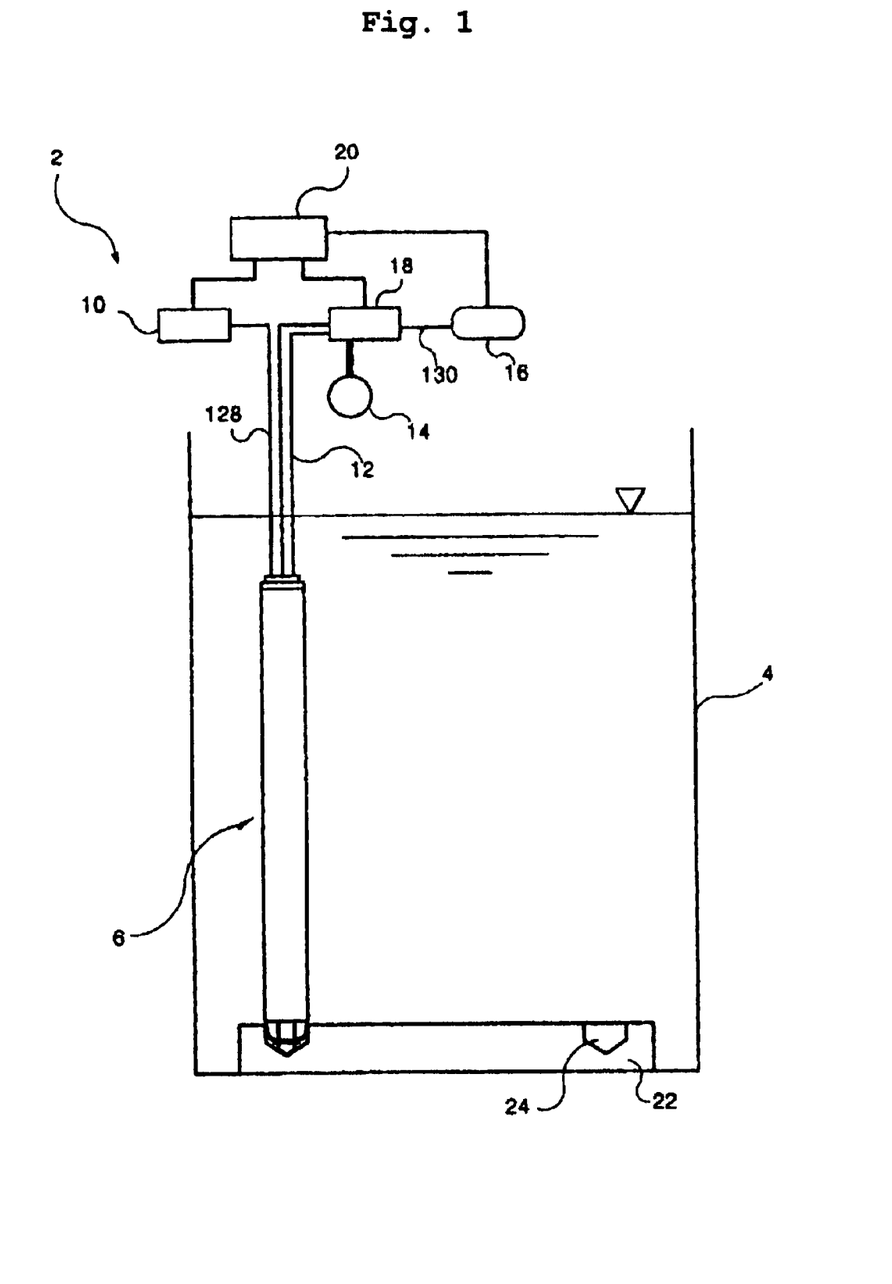
FIG. 1 is a schematic view showing an in-pile creep test system in accordance with the preferred embodiment of the present invention, installed in a water pool of a research reactor.
Figure 2:
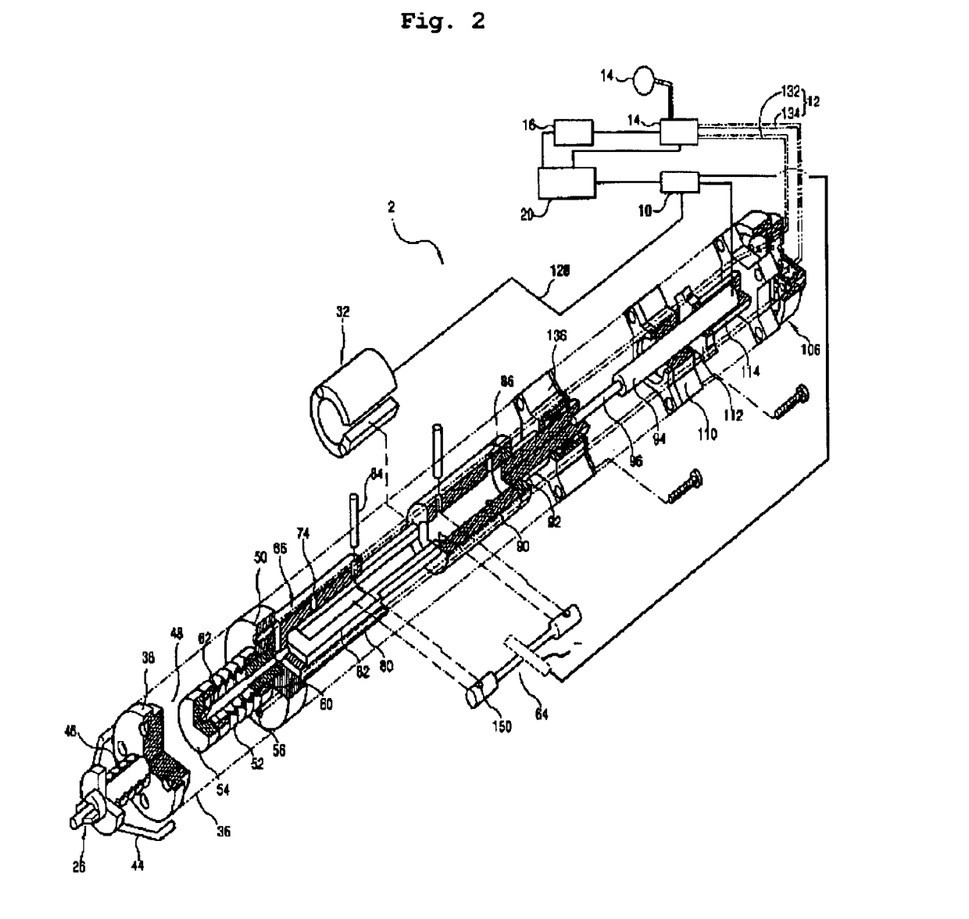
FIG. 2 is a partially sectioned perspective view, showing the construction of the in-pile creep test system in accordance with the present invention.

As shown in the drawings, the in-pile creep test system 2 according to the preferred embodiment of the present invention comprises a creep tester 6, a detecting unit 10, a gas supply unit 18, and a control unit 20. The creep tester 6 is vertically installed in a water pool 4 of a research reactor. The detecting unit 10 is electrically connected to the creep tester 6, and detects the temperature of the heating unit 32 and creep strain of an irradiated specimen 64 during a creep test. The gas supply unit 18 is connected to the creep tester 6 through gas supply tubes 12, and controllably supplies helium gas from a helium gas reservoir tank 14 to the creep tester 6 or returns helium gas from the tester 6 to the tank 14 with the use of compressed air generated by an air compressor 16. The control unit 20 is electrically connected to both the detecting unit 10 and the gas supply unit 18 so as to control the operation of the creep test system 2 in response to results of a comparison of input data from the detecting unit 10 and the gas supply unit 18 with stored data.

The water pool 4 is a unit of a conventional research reactor, and contains distilled water. The in-pile creep test for measuring and determining mechanical properties of irradiated nuclear materials is performed in the pool 4. Provided on the bottom of the water pool 4 is a base 22, with a plurality of tester installation slots 24 formed on the base 22 to vertically hold creep testers 6 on the base 22.

Figure 3:
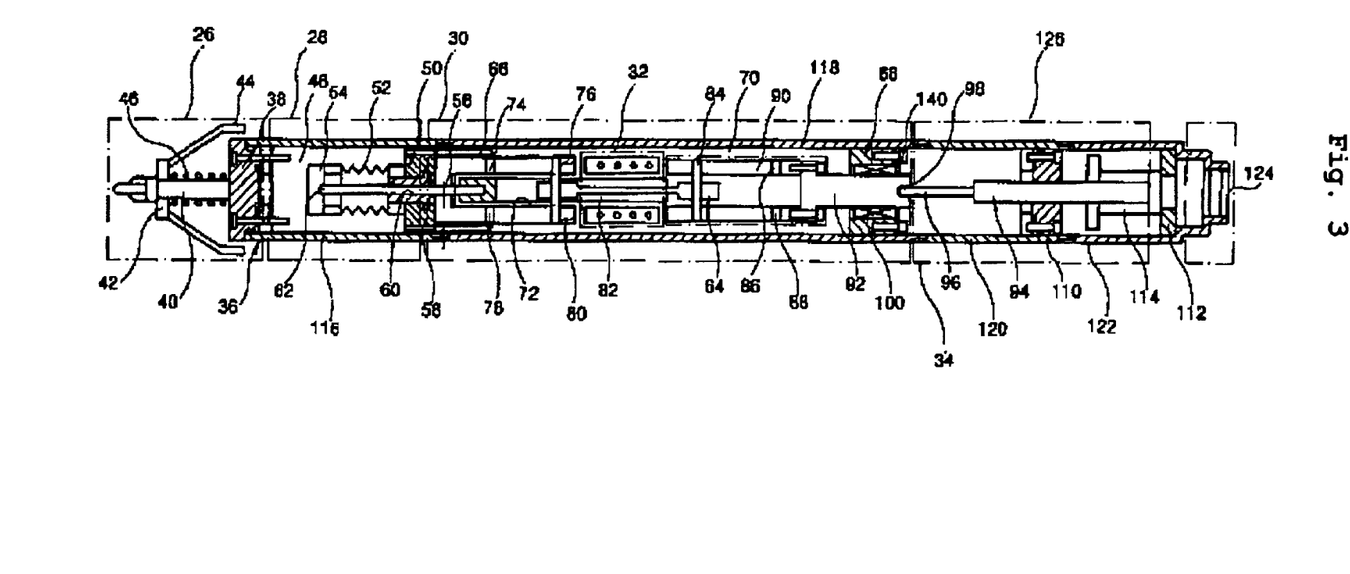
FIG. 3 is a sectional view of a creep tester included in the in-pile creep test system in accordance with the present invention.

The creep tester 6 comprises a fixing unit 26, a pressurizing unit 28, a movable unit 30, a heating unit 32, and a measuring unit 34, which are mounted to or set in a cylindrical capsule 36.

The fixing unit 26 of the creep tester 6 is fixed to a tester installation slot 24 of the base 22 on the bottom of the water pool 4 so as to vertically hold the creep tester 6 on said base 22. The fixing unit 26 comprises a base plate 38 that is provided at an end of the capsule 36, with a fixing shaft 40 axially projecting from the center of the base plate 38.

A stop plate 42 is movably fitted over the fixing shaft 40, with three stop rods 44 extending from the stop plate 42 toward the base plate 38 at three regularly spaced positions. Each of the stoop rods 44 is bent at a middle portion thereof. A coiled biasing member 46 is fitted over the fixing shaft 40 so as to bias the stop plate 42 in a predetermined direction.

Figure 4:
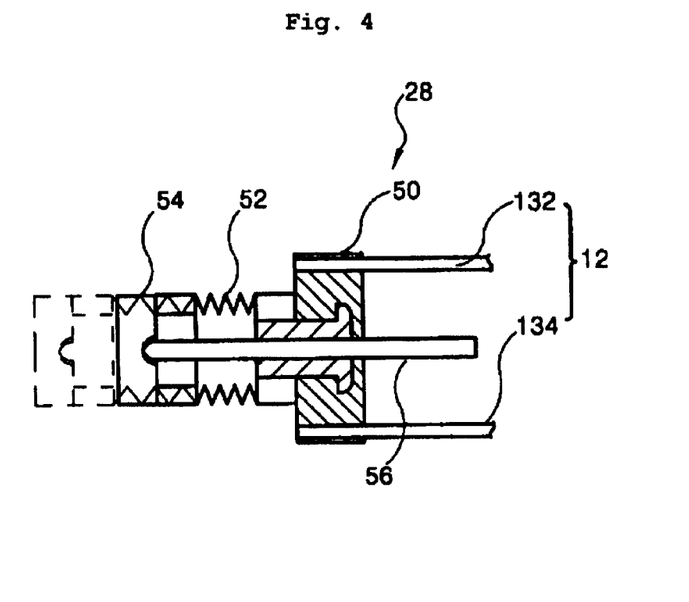
FIG. 4 is a view of a pressurizing unit included in the creep tester in accordance with the present invention.

The pressurizing unit 28 is pressurized or depressurized by helium gas fed into a chamber 48 defined in the capsule 36 at a position adjacent to the fixing unit 26. The pressurizing unit 28 comprises a fixed first plate 50, a bellows tube 52, and a push plate 54. The first plate 50 is fixedly set in the capsule 36 at a position spaced apart from the base plate 38 at a predetermined interval. The bellows tube 52 is mounted to the first plate 50 at a position inside the chamber 48, while the push plate 54 is formed at the end of the bellows tube 52 so as to selectively push the movable unit 30. For contraction effect, a spring is installed on the push rod 56 so as to effectively pull the movable unit 3.

A bushing 58 having a central hole 60 is set at the center of the first plate 50, while a push rod 56 of the movable unit 30 axially and movably passes through the central hole 60 of the bushing 58. In order to allow a compressive deformation of the specimen 64 during a compression creep test, a spring may be installed on the push rod 56 of the movable unit 30. The spring enhances a depressurizing effect of the pressurizing unit 28 as well as allowing an easy retraction of the movable unit 30.

A push rod slot 62 is formed on the push plate 54 so as to receive the end of the push rod 56 of the movable unit 30, thus allowing the push plate 54 to accomplish precise pressure transmission to the push rod 56.

Figure 5:
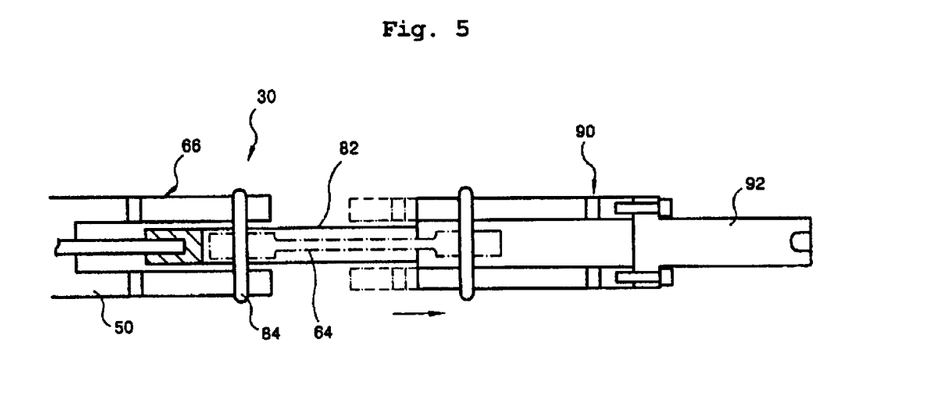
FIG. 5 is a view of a movable unit included in the creep tester in accordance with the present invention.

The movable unit 30 is moved in accordance with an operation of the pressurizing unit 28, thus applying tensile or compressive force to the specimen, and comprises two holder units, that is, a first holder unit 66 and a second holder unit 70. The first holder unit 66 is set at a position adjacent to the first plate 50 of the pressurizing unit 28, and is divided on the basis of the central axis of the capsule 36 into two parts, that is, upper and lower holder plates spaced apart from each other by a predetermined gap. The second holder unit 70 is assembled with the first holder unit 66 while being partially overlapped with the first holder unit 66, and is movably assembled with a first guide stopper 68 which is set in the capsule 36 at a position spaced apart from the first plate 50 by a predetermined distance.

In a detailed description, the first holder unit 66 comprises a guide slot 72 that is formed along the central axis of the movable unit 30, with the upper and lower holder plates 76 and 80 formed at upper and lower portions around the guide slot 72, respectively, such that they face each other. The upper holder plate 76 has a plurality of upper locking holes 74, while the lower holder plate 80 has a plurality of lower locking holes 78.

The second holder unit 70 comprises the push rod 56, which has a predetermined length and movably passes through the central hole 60 of the first plate's bushing 58. The second holding unit 70 also has a specimen holding rod 82 and a cylindrical holder pipe 90. The specimen holding rod 82 has a U-shape so as to stably hold the specimen 64, and is coupled to the end of the push rod 56. The cylindrical holder pipe 90 is connected to the end of the U-shaped specimen holding rod 82, and has a plurality of upper and lower locking holes 86 and 88 so as to hold the specimen 64 with the use of locking pins 84 inserted in the locking holes 86 and 88. A slide shaft 92 is connected to an end of the holder pipe 90, and movably passes through the central opening of the first guide stopper 68 welded in the capsule 36.

The slide shaft 92 has a probe-seating slot 98 at the center of an end surface thereof, such that a probe 96 of a strain-measuring instrument 94, such as an LVDT, is precisely arranged along the central axis of the tester 6.

An O-ring type bearing 100 made of a carbon plate is set in the central opening of the first guide stopper 68 so as to movably bear the slide shaft 92 in the guide stopper 68 while preventing frictional contact between the first guide stopper 68 and the slide shaft 92.

Figure 7:
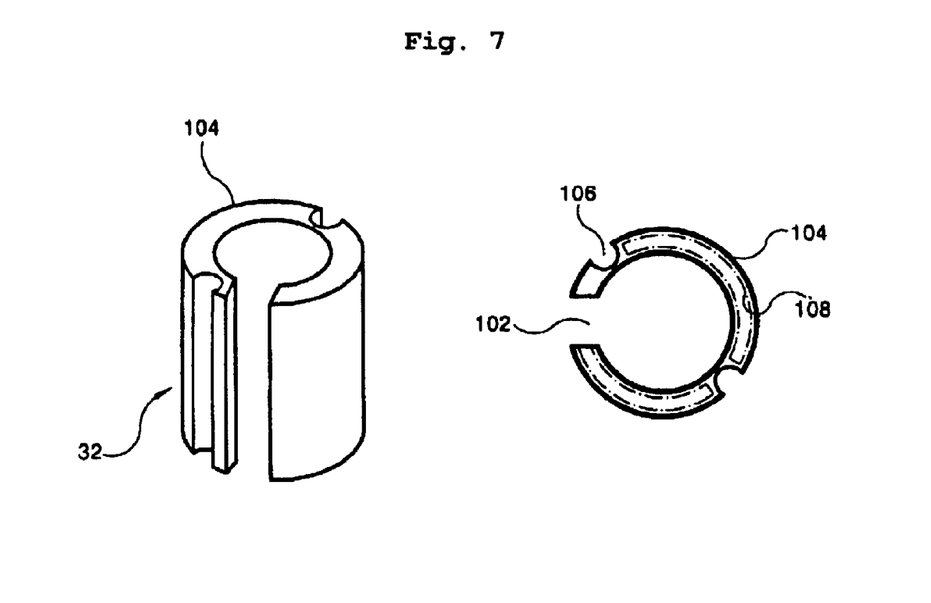
FIG. 7 is a view of a heating unit included in the creep tester in accordance with the present invention.

The heating unit 32 is assembled with the movable unit 30 and is used for heating the specimen 64, and comprises a cylindrical heater housing 104 having a heater 108 made of silicon carbide. An axial slit 102 is formed at the sidewall of the heater housing 104 so as to allow the housing 104 to be fitted over the U-shaped specimen holding rod 82 from a side of the rod 82. Axially formed on the external surface of the heater housing 104 are two tube-seating grooves 106 which allow the gas supply tubes 12 to pass along the external surface of the housing 104. The heater 108 made of silicon carbide is set in the sidewall of the heater housing 104, and is electrically connected to the detecting unit 10.

Figure 6:
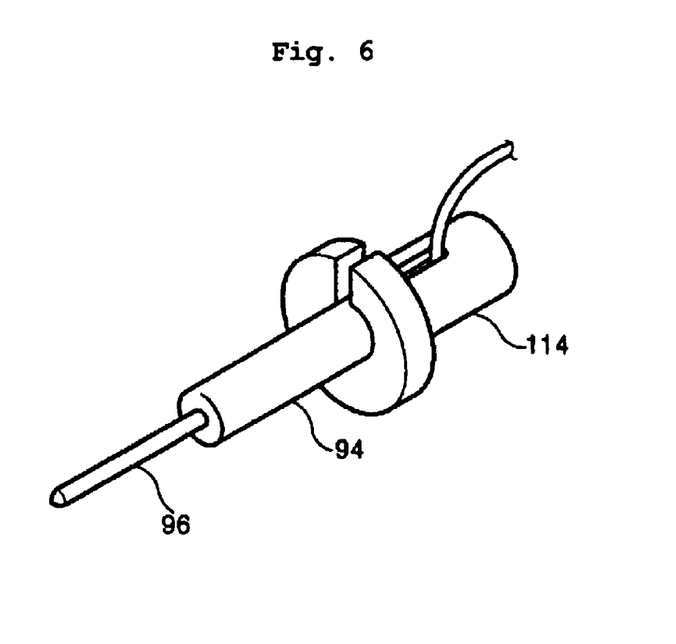
FIG. 6 is a view of a measuring unit included in the creep tester in accordance with the present invention.

The measuring unit 34 senses a movement of the movable unit 30 to measure the creep strain of the tensioned or compressed specimen 64. The measuring unit 34 comprises the LVDT 94 and a fixing cap 114. The LVDT 94, which is a conventional strain-measuring instrument, axially passes through the center of a second guide stopper 110 such that the LVDT 94 is axially aligned with the slide shaft 92 of the movable unit 30 held by the first guide stopper 68. The fixing cap 114 is assembled with an end of the LVDT 94, and is attached to a third guide stopper 112 such that the LVDT 94 comes into contact with the slide shaft 92 at its probe 96.

The capsule 36 is a cylindrical body consisting of first to fourth capsule parts 116, 118, 120 and 122. The first capsule part 116 supports the fixing unit 26, and houses the pressurizing unit 28 while defining the chamber 48. The pressurizing unit 28 is set in the first capsule part 116 by the first plate 50 welded to the internal surface of the first capsule part 116. The second capsule part 118 is assembled with an end of the first capsule part 116, and houses the movable unit 30. In such a case, the movable unit 30 is set in the second capsule part 118 through a process of welding the first guide stopper 68 to the inner surface of said second capsule part 118 for the convenience of assembling the capsule parts.

The third capsule part 120 is assembled with an end of the second capsule part 118, and houses the measuring unit 34. In order to set the measuring unit 34 in the third capsule part 120 such that the measuring unit 34 is aligned with the central axis of the third capsule part 120, the second guide stopper 110 is welded to the inner surface of the third capsule part 120. The fourth capsule part 122 is assembled with an end of the third capsule part 120, and houses the fixing cap 114 of the LVDT 94. In order to set the fixing cap 114 in the fourth capsule part 122, the third guide stopper 112 is welded to the inner surface of the fourth capsule part 122.

It is necessary to seal the fourth capsule part 122, through which the electric wires for both the heating unit 32 and the measuring unit 34 are led into the capsule 36 and the gas supply tubes 12 are led from the gas supply unit 18 into the capsule 36. In order to accomplish the above object, a sealing capsule part 126 having two porous sealing plates 124 is integrated with an end of the fourth capsule part 122.

The detecting unit 10 is selected from conventional detecting units, and is electrically connected to the control unit 20, the silicon carbide heater 108 of the heating unit 32, and the LVDT 94, thus detecting temperature of the heating unit 32 and strain of the irradiated specimen 64.

In such a case, the electric wires 128 connecting the detecting unit 10 to both the heater 108 and the LVDT 94 of the tester 6 extend in the capsule 36.

The gas supply unit 18 is designed in a conventional manner, and is electrically connected to the control unit 20, thus being operated under the control of the control unit 20. The gas supply unit 18 is connected to both the air compressor 16 and the helium gas reservoir tank 14 through a gas pipe 130, and communicates with the second capsule part and the chamber 48 of the pressurizing unit 28 through the gas supply tubes 12. In the present invention, the gas supply unit 18 is provided with a vacuum pump (not shown) at a predetermined position.

The gas supply tubes 12 comprise first and second tubes 132 and 134. During a gas supply mode for tensioning the irradiated specimen, the two tubes 132 and 134 are used to feed helium gas to the chamber 48 at the same time. However, during a gas return mode for compressing the irradiated specimen, one of the two gas supply tubes 132 and 134 is used for feeding compressed air to the chamber 48, and the other is used for returning helium gas from the chamber 48 to the reservoir tank 14.

The first plate 50 is welded in the first capsule part 116, with the gas supply tubes 12 being connected to the plate 50.

Figure 8:
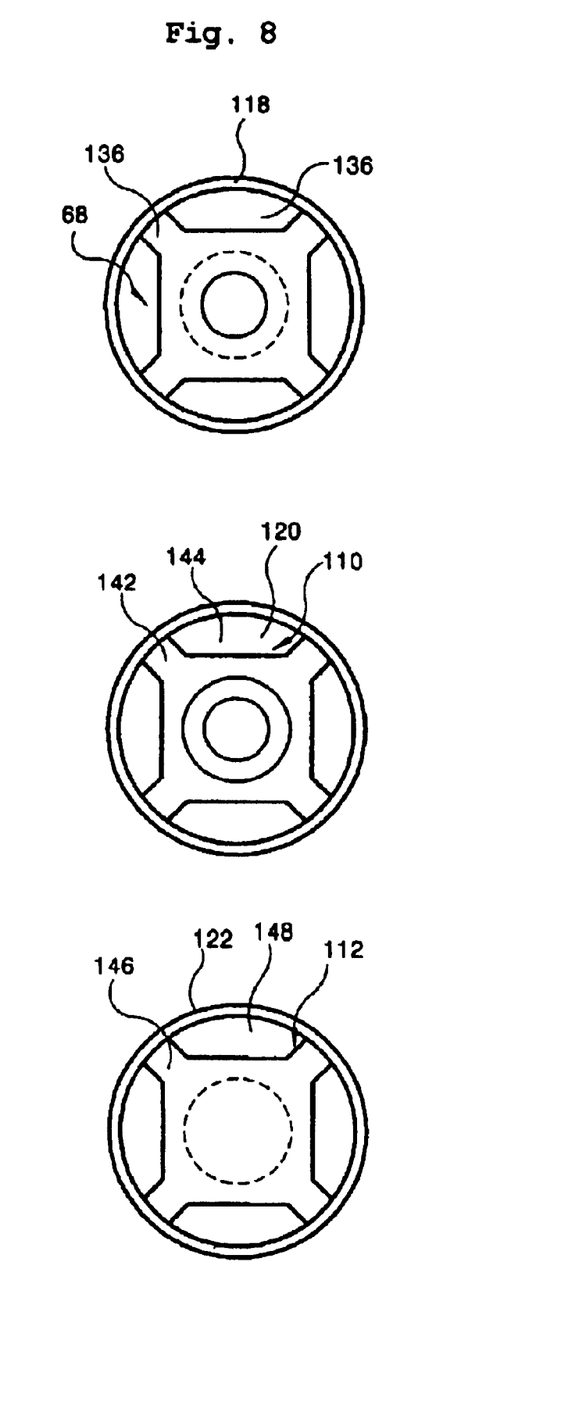
FIG. 8 is a view of three guide stoppers included in the creep tester in accordance with the present invention.

The first guide stopper 68 is welded in the second capsule part 118. As shown in FIG. 8, four first radial ribs 136 extend outwardly from the body of the first guide stopper 68 in four radial directions, and are welded to the internal surface of the second capsule part 118. Due to the radial ribs 136, a plurality of first spaces 136 are defined between the external surface of the first guide stopper 68 and the internal surface of the second capsule part 118, so the gas supply tubes 12 and the electric wires for electrically operated units, such as the heating unit 32, smoothly pass in the capsule 36 without being blocked by the first guide stopper 68.

In an effort to prevent an undesired removal of the bearing 100 from the first guide stopper 68, a stop plate 140 is mounted to an end surface of the first guide stopper 68.

The second guide stopper 110 is set in the third capsule part 120. As shown in FIG. 8, four second radial ribs 142 extend outwardly from the body of the second guide stopper 110 in four radial directions, and are welded to the internal surface of the third capsule part 120. Due to the radial ribs 142, a plurality of second spaces 144 are defined between the external surface of the second guide stopper 110 and the inner surface of the third capsule part 120, so the gas supply tubes 12 and the electric wires for the electrically operated units, such as the heating unit 32, smoothly pass in the capsule 36 without being blocked by the second guide stopper 110.

The third guide stopper 112 is set in the fourth capsule part 122. In the same manner as that described for the first and second guide stoppers 68 and 110, four third radial ribs 146 extend outwardly from the body of the third guide stopper 112 in four radial directions, and are welded to the internal surface of the fourth capsule part 122. Due to the radial ribs 146, a plurality of third spaces 148 are defined between the third guide stopper 112 and the fourth capsule part 122, so the gas supply tubes 12 and the electric wires smoothly pass in the capsule 36 without being blocked by the third guide stopper 112.

In the creep tester 6, the pressurizing unit 28, second capsule part 118, third capsule part 120 and the fourth capsule part 122 are isolated from each other while being independently sealed, so even though there is an unexpected breakage or damage to a part of the creep tester 6, the breakage or damage is not propagated to another part, but is limited to the originally broken or damaged part. Therefore, it is possible to reduce breakage or damage to the specimen during a procedure of disassembling the capsule into pieces after a materials irradiation test, as well as making it easy to disassemble the capsule.

The specimen 64 installed in the tester 6 of the in-pile creep test system 2 is a specimen of a nuclear material, and has locking holes 150 at both ends so as to be held in the movable unit 30 by the locking pins 84. Of course, it is possible to selectively install any one of specimens 64 of a variety of materials, having different sizes and shapes, such as materials having cylindrical shapes, plate-type shapes or rod-type shapes, in the tester 6, as desired.

The operation and effect of the in-pile creep test system of the present invention will be described herein below.

In order to perform an in-pile creep test for measuring and determining mechanical properties of an irradiated material, the creep tester 6 of the special instrumented capsule type is vertically installed in the water pool 4 containing distilled water.

That is, the creep tester 6 is vertically held on the base 22 in the water pool 4 with the use of the fixing unit 26. The control unit 20 controls the detecting unit 10 on the basis of stored data, thus allowing the heating unit 32 to generate heat. The control unit 20 also controls the gas supply unit 18 so as to controllably feed helium gas to the chamber 48 of the tester 6. Due to pressure of the helium gas in the chamber 48, the pressurizing unit 28 actuates the movable unit 30, thus causing expansion or shrinkage of the movable unit 30. Therefore, tensile load or compressive load or repeated low cyclic load is applied to the specimen 64 installed in the movable unit 30, thus applying tensile or compressive force to the specimen 64.

In such a case, the measuring unit 34 installed in contact with the movable unit 30 measures creep strain of the specimen 64, and outputs a signal indicative of the creep strain to the control unit 20. The control unit 20 thus compares data signals from both the measuring unit 34 and the detecting unit 10 with stored date, and controls the gas supply unit 18 in response to the signal comparison results so as to controllably supply or return helium gas to or from the chamber 48.

The operation of the in-pile creep test system 2 according to the present invention will be described in more detail herein below. In order to perform a tensile creep test for measuring and determining mechanical properties of an irradiated material using the system 2, a specimen 64 of the target material is axially installed on the U-shaped specimen holding rod 82, prior to assembling the creep tester 6. The U-shaped specimen holding rod 82 having the specimen 64 is, thereafter, set in both the first holder unit 66 and the holder pipe 90 of the movable unit 30 such that the middle portion of the U-shaped specimen holding rod 82 is exposed at a position between the first holder unit 66 and the holder pipe 90. Thereafter, the locking pins 84 are inserted into the two pairs of upper and lower holes 74 and 78, respectively, such that the locking pins 84 pass through the locking holes 150 of the specimen 64.

After installing the specimen 64 in the movable unit 30, the heater housing 104 of the heating unit 32 is fitted over the exposed middle portion of the U-shaped specimen holding rod 82 from a side of the rod 82 through the axial slit 102 of the housing 104. Thereafter, the fixing unit 26 is mounted to the first capsule part 116. In addition, the pressurizing unit 28 and the movable unit 30 are housed in the first and second capsule parts 116 and 118, respectively, and the measuring unit 34 is housed in the third and fourth capsule parts 120 and 122. Thereafter, the sealing capsule part 126 having the two porous sealing plates 124 is integrated with the end of the fourth capsule part 122, thus completely assembling the parts of the creep tester 6 into a single structure.

When the in-pile creep test system 2 starts a tensile creep test after the creep tester 6 is vertically installed in the water pool 4, the control unit 20 controls the gas supply unit 18 in accordance with stored data, thus feeding highly pressurized helium gas from the helium gas reservoir tank 14 to the chamber 48 of the tester 6 through the first and second gas supply tubes 132 and 134.

The highly pressurized helium gas fed to the chamber 48 pushes the push plate 54, thus pushing the push rod 56 of the movable unit 30, so tensile force is imposed on the specimen 64 which is held in the first holder part 66 and the holder pipe 90 by the locking pins 84.

In such a case, the control unit 20 also outputs a control signal to the detecting unit 10, and applies electric power to the silicon carbide heater 108 of the heating unit 32. The heater 108 thus generates heat. In addition, the gas supply unit 18 feeds highly pressurized helium gas from the helium gas reservoir tank 14 to the chamber 48 through the first and second gas supply tubes 132 and 134 in response to a control signal outputted from the control unit 20.

In order to perform a compression creep test for measuring and determining mechanical properties of an irradiated material using the system 2, the bellows tube 52 of the pressurizing unit 28 is compressed to the maximum with the use of the gas supply unit 18 and the push rod 56 is welded to the push plate 54 during the procedure of installing a specimen 64 in the creep tester 6 while assembling the parts of the tester 6 into a single structure. The specimen 64 of a target material is axially installed on the U-shaped specimen holding rod 82, and the U-shaped specimen holding rod 82 having the specimen 64 is set in both the first holder unit 66 and the holder pipe 90 of the movable unit 30 such that the middle portion of the U-shaped specimen holding rod 82 is exposed at the position between the first holder unit 66 and the holder pipe 90. Thereafter, the locking pins 84 are inserted into the two pairs of upper and lower holes 74 and 78, respectively, such that the locking pins 84 pass through the locking holes 150 of the specimen 64.

Thereafter, the heater housing 104 of the heating unit 32 is fitted over the exposed middle portion of the U-shaped specimen holding rod 82 from a side of the rod 82 through the axial slit 102 of the housing 104. Thereafter, the fixing unit 26 is mounted to the first capsule part 116. The pressurizing unit 28 and the movable unit 30 are housed in the first and second capsule parts 116 and 118, respectively, and the measuring unit 34 is housed in the third and fourth capsule parts 120 and 122. Thereafter, the sealing capsule part 126 is integrated with the end of the fourth capsule part 122 through a welding process, thus completely assembling the parts of the creep tester 6 into a single structure. In such a case, a spring may be installed on the push rod 56 of the movable unit 30 in an effort to enhance the depressurizing effect of the pressurizing unit 28 as well as allowing an easy retraction of the movable unit 30, thus increasing operational efficiency of the creep tester 6 while compressing the specimen 64.

When the in-pile creep test system 2 starts a compression creep test after the creep tester 6 is vertically installed in the water pool 4, the control unit 20 controls the gas supply unit 18 in accordance with stored data to feed compressed air to the chamber 48 through one of the two gas supply tubes 132 and 134, and return helium gas from the chamber 48 to the reservoir tank 14 through the other gas supply tube. Simultaneously the helium gas is supplied to the second capsule 118 from reservoir tank 14. Pressure in the chamber 48 is thus reduced and the pressure in the second capsule is thus increased.

Due to the reduction in pressure in the chamber 48 inside the first capsule part 116 and the increase in the pressure in the second capsule, the push rod 56 of the movable unit 30 is pulled, so compressive force is imposed on the specimen 64 that is held in the first holder part 66 and the holder pipe 90 by the locking pins 84.

In such a case, the control unit 20 also outputs a control signal to the detecting unit 10, and applies electric power to the silicon carbide heater 108 of the heating unit 32, so the heater 108 thus generates heat. In addition, the vacuum pump of the gas supply unit 18 is operated, in response to a control signal outputted from the control unit 20, to return the helium gas from the chamber 48 to the helium gas reservoir tank 14 through one of the first and second gas supply tubes 132 and 134.

During a tensile, compressive or repeated loading or cyclic fatigue creep test, highly pressurized helium gas is fed from the tank 14 to the chamber 48 through the gas supply tubes 12, so the gas supply tubes 12 continuously maintain a low temperature. Since such low temperature gas supply tubes 12 pass along the tube-seating grooves 106 which are axially formed on the external surface of the heater housing 104, it is possible to prevent the heating unit 32 from being overheated. The detecting unit 10, which is electrically connected to the heating unit 32, detects the temperature of the heating unit 32, and outputs a data signal indicative of temperature of the heating unit 32 to the control unit 20.

A temperature sensor may be mounted at a position on the specimen 64, and senses a temperature of the specimen 64. The temperature sensor outputs a signal indicative of the specimen's temperature to the control unit 20, and the control unit 20 appropriately adjusts output power of the heating unit 32 in response to the signal from the temperature sensor. It is thus possible to obtain a desired experimental temperature for the specimen by repeatedly sensing the temperature of the specimen 64 and repeatedly adjusting the output power of the heating unit 32. During the creep test, the temperature of the specimen is reduced when the pressure of supplied helium gas is increased to enhance heat transfer efficiency, but the temperature is increased when the pressure of supplied helium gas is lowered to reduce heat transfer efficiency.

In other words, during such a tensile creep test, highly pressurized helium gas is fed from the helium gas reservoir tank 14 to the chamber 48 through the gas supply tubes 12, and, 20 at the same time, the silicon carbide heater 108 of the heating unit 32 is turned on the detecting unit 10, thus continuously generating heat.

Before or after a creep test, the detecting unit 10 and the gas supply unit 18 are initialized under the control of the control unit 20.

When the specimen 64 is deformed to create tensile, compressive or cyclic strain, the slide shaft 92 of the movable unit 30 is moved in either direction under the guide of the first guide stopper 68, so the probe 96 of the LVDT 94 constituting the measuring unit 34 advances or retracts.

When cutting both ends of the capsule 36, it is possible to remove the tested specimen 64 from the tester 6. In such a case, the specimen 64 is held in the first and second holder units 66 and 70 of the movable unit 30 with the use of the locking pins 84, so it is easy to remove the tested specimen 64 from the tester 6.

Since the LVDT 94 is electrically connected to the detecting unit 10, the detecting unit 10 detects the strain of the specimen, and outputs a signal indicative of the specimen's strain to the control unit 20, thus allowing the control unit 20 to measure and determine the creep testing results.

It is possible to measure creep strain of any one of specimens having a variety of lengths and shapes, such as specimens having cylindrical shapes, plate-type shapes or rod-type shapes, with the use of the in-pile creep test system 2 of the present invention. Such a compatibility of the system 2 is simply and easily accomplished by appropriately adjusting the length of the slide shaft 92.

Figure 9:
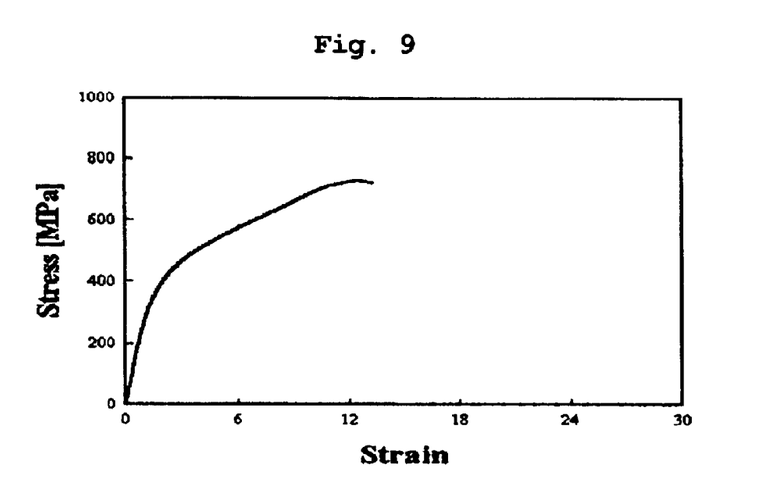
FIG. 9 is a graph showing the stress-strain curve of an irradiated nuclear clad tube tested with the use of the in-pile creep test system in accordance with the present invention.

In addition to creep tests for newly developed nuclear materials, the in-pile creep test system 2 of the present invention is used in creep tests for nuclear clad tubes. As shown in FIG. 9, which is a graph showing the stress-strain curve of an irradiated nuclear clad tube tested with the use of the in-pile creep test system 2, the system 2 of this invention is operated to precisely measure and determine mechanical properties of nuclear clad tubes.

Therefore, it is noted that the in-pile creep test system 2 of the present invention is preferably and effectively used in creep tests for measuring and determining mechanical properties of irradiated materials having a variety of shapes and sizes during a procedure of developing new nuclear materials.

As described above, the present invention provides an in-pile creep test system used for measuring and determining mechanical properties of nuclear materials irradiated in research reactors. The creep test system is advantageous in that it allows an effective and uniform irradiation to the area of the gauge length of a specimen during an in-pile creep test.

The creep test system of the present invention is also fabricated with a minimum number of parts for applying tensile or compressive force to an irradiated specimen and a minimum number of instruments for measuring creep strain of the irradiated specimen in an effort to minimize the amount of nuclear wastes generated after a creep test. Therefore, the system is easily fabricated and reduces the amount of nuclear wastes.

The creep test system is also designed such that it is easy to cut the capsule of a creep tester and disassemble a tested specimen from the capsule in a hot cell, while preventing damage or breakage of the specimen during a procedure of cutting the capsule and removing the tested specimen from the capsule.

In the in-pile creep test system, the mechanical structure for applying load to the irradiated specimen during a creep test is designed such that it is not influenced by irradiation.

The test system also maximizes the effect of irradiation to the specimen.

Another advantage of the in-pile creep test system resides in that the test system is compatibly used in a tensile or compressive creep test for irradiated specimens having a variety of shapes and sizes.

The test system of the present invention is used in low speed fatigue tests for irradiated specimens having various shapes and sizes.

A further advantage of the test system resides in that it is possible to easily and appropriately control the temperature of heat transmitted to the irradiated specimen.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An in-pile creep test system, comprising:
   a creep tester vertically installed in a water pool of a nuclear reactor and comprising a fixing unit, a pressurizing unit, a movable unit, a heating unit, a measuring unit and a plurality of capsule parts;
   a detecting unit electrically connected to said creep tester;
   a gas supply unit connected to said creep tester through gas supply tubes;
   a control unit electrically connected to both said detecting unit and gas supply unit;
   wherein said heating unit comprises a cylindrical heater housing with an axial slit formed at its side wall and a plurality of said gas supply tube-seating grooves axially formed on its external surface, and said capsule parts are cylindrical, isolated from each other and sealed separately with independently controlled internal pressure for loading in said pressurizing unit and temperature controlling in said heating unit respectively.

2. The in-pile creep test system according to claim 1, wherein said fixing unit is fixed to the water pool so as to vertically install the creep tester in the water pool;
   said pressurizing unit is pressurized or depressurized by compressed helium gas fed into a chamber defined in the creep tester at a position adjacent to said fixing unit;
   said movable unit applies tensile load, compressive load or repeated load to the specimen in response to an operation of said pressurizing unit;
   said heating unit is assembled with said movable unit and used for heating the specimen;
   said measuring unit for detects a movement of said movable unit so as to measure creep strain of said specimen;
   wherein said fixing unit is mounted to an end of said capsule, and said pressurizing unit, said movable unit, said heating unit and said measuring unit are housed in said capsule parts respectively and successively.

3. The in-pile creep test system according to claim 2, wherein said fixing unit comprises:
   a base plate provided at an end of said capsule;
   a fixing shaft axially projecting from a center of said base plate;
   a stop plate movably fitted over said fixing shaft; and
   an elastic member provided between the base plate and the stop plate so as to bias the stop plate in a predetermined direction.

4. The in-pile creep test system according to claim 2, wherein said pressurizing unit comprises:
   a first plate fixedly set in said capsule at a position spaced apart from the base plate at a predetermined interval, and defining the chamber;
   a bellows tube mounted to the first plate at a position inside the chamber;
   a push plate integrally mounted to an end of the bellows tube so as to selectively push the movable unit.

5. The in-pile creep test system according to claim 4, wherein a push rod slot is formed on said push plate so as to allow a push rod of said movable unit to come into precise contact with the push plate.

6. The in-pile creep test system according to claim 2, wherein said movable unit comprises:
   a first holder unit set at a position adjacent to a first plate of the pressurizing unit, and divided on the basis of a central axis of the capsule into two parts which are spaced apart from each other by a predetermined gap; and
   a second holder unit assembled with said first holder unit while being partially overlapped with the first holder unit, said second holder unit being movably assembled with a first guide stopper which is set in the capsule at a position spaced apart from the first plate of the pressurizing unit by a predetermined distance.

7. The in-pile creep test system according to claim 6, wherein said first holder unit comprises:
   a guide slot formed along the central axis of the capsule;
   an upper holder plate formed at an upper portion around said guide slot, and having a plurality of upper locking holes; and
   a lower holder plate formed at a lower portion around said guide slot so as to face the upper holder plate, and having a plurality of lower locking holes.

8. The in-pile creep test system according to claim 7, wherein said second holder unit comprises:
   a push rod having a predetermined length and movably passing through a central hole of the first plate;
   a U-shaped specimen holding rod coupled to an end of said push rod so as to hold the specimen;

a cylindrical holder pipe connected to an end of said U-shaped specimen holding rod and having a plurality of upper and lower locking holes so as to hold the specimen with the use of locking pins inserted in said upper and lower locking holes; and a slide shaft connected to an end of said cylindrical holder pipe and movably passing through the central opening of said first guide stopper.

9. The in-pile creep test system according to claim 8, wherein said slide shaft has a probe-seating slot at a center of an end surface thereof, such that a probe of a strain-measuring instrument, such as a linear variable differential transducer, is precisely arranged along the central axis of the capsule.

10. The in-pile creep test system according to claim 8, wherein a bearing member is set in the central opening of the first guide stopper so as to movably bear the slide shaft in said first guide stopper while preventing frictional contact between the first guide stopper and the slide shaft.

11. The in-pile creep test system according to claim 2, wherein said measuring unit comprises:

a strain-measuring instrument, such as a linear variable differential transducer (LVDT), axially passing through the center of a second guide stopper in the capsule such that the strain-measuring instrument is axially aligned with a slide shaft of the movable unit held by a first guide stopper; and a fixing cap assembled with an end of said strain-measuring instrument, and attached to an end surface of a third guide stopper mounted in said capsule.

12. The in-pile creep test system according to claim 2, wherein said capsule comprises:

a first capsule part for supporting said fixing unit, and housing the pressurizing unit while defining the chamber, with a first plate being welded to an internal surface of the first capsule part so as to hold said pressurizing unit in the first capsule part;

a second capsule part assembled with an end of said first capsule part and housing the movable unit, with a first guide stopper being welded to an inner surface of said second capsule part so as to hold the movable unit in the second capsule part;

a third capsule part assembled with an end of said second capsule part and housing the measuring unit, with a second guide stopper being welded to an inner surface of the third capsule part so as to hold the measuring unit in the third capsule part such that the measuring unit is aligned with a central axis of the third capsule part;

a fourth capsule part assembled with an end of the third capsule part and housing a fixing cap of a strain-measuring instrument, with a third guide stopper being welded to an inner surface of the fourth capsule part so as to hold the fixing cap in said fourth capsule part; and a sealing capsule part having a plurality of porous sealing plates assembled with an end of said fourth capsule part so as to seal the fourth capsule part through which electric wires for both the heating unit and the measuring unit are led into the capsule and the gas supply tubes are led from the gas supply unit into the capsule.

13. The in-pile creep test system according to claim 2, wherein said pressurizing unit, second capsule part, third capsule part, and fourth capsule part of said capsule are isolated from each other and independently sealed, so even though there is breakage or damage to a part of the creep tester during a procedure of cutting and disassembling the capsule, the breakage or damage is not propagated to another part, but is limited to the originally broken or damaged part, thus minimizing breakage or damage to the specimen.

14. The in-pile creep test system according to claim 2, wherein said movable unit of the creep tester comprises a U-shaped specimen holding rod, an upper holder unit, a lower holder unit and a holder pipe, which are designed to apply tensile load, compressive load or repeated load to any one of specimens having various sizes and shapes, such as materials having cylindrical shapes, plate-type shapes or ring-type shapes.

15. The in-pile creep test system according to claim 2, wherein a lower holder unit of the movable unit is assembled with the pressurizing unit including a bellows tube, thus accomplishing an easy arrangement of both the specimen and the movable unit in the creep tester, as well as a simple structure of the creep tester.

* * * * *